(12) United States Patent
Caldow et al.

(10) Patent No.: US 11,519,841 B2
(45) Date of Patent: Dec. 6, 2022

(54) CONDENSATION PARTICLE COUNTER EFFICIENCY COMPENSATION FOR ALTITUDE

(71) Applicant: TSI Incorporated, Shoreview, MN (US)

(72) Inventors: Robert Caldow, Roseville, MN (US); Jason Paul Johnson, Saint Paul, MN (US); Hee-Siew Han, Minneapolis, MN (US); Jacob Scheckman, Minneapolis, MN (US)

(73) Assignee: TSI Incorporated, Shoreview, MN (US)

( * ) Notice: Subject to any disclaimer, the term of this patent is extended or adjusted under 35 U.S.C. 154(b) by 733 days.

(21) Appl. No.: 16/423,791

(22) Filed: May 28, 2019

(65) Prior Publication Data

US 2019/0368996 A1   Dec. 5, 2019

Related U.S. Application Data

(60) Provisional application No. 62/677,622, filed on May 29, 2018.

(51) Int. Cl.
*G01N 15/08* (2006.01)
*G01N 15/06* (2006.01)
(Continued)

(52) U.S. Cl.
CPC ....... *G01N 15/0826* (2013.01); *G01N 15/065* (2013.01); *G01N 2015/0042* (2013.01); *G01N 2015/1486* (2013.01)

(58) Field of Classification Search
CPC ............. G01N 15/0826; G01N 15/065; G01N 2015/0042; G01N 2015/1486
See application file for complete search history.

(56) References Cited

U.S. PATENT DOCUMENTS 5,026,155 A   6/1991   Ockovic et al.
5,118,959 A   6/1992   Caldow et al.
(Continued)

FOREIGN PATENT DOCUMENTS

AT   517948         6/2017
AT   517948 B1 *   6/2017   ........... G01N 1/2247
(Continued)

OTHER PUBLICATIONS

"International Application Serial No. PCT US2019 034135, International Search Report dated Aug. 21, 2019", 3 pgs.
(Continued)

*Primary Examiner* — Tarun Sinha
*Assistant Examiner* — Sharad Timilsina
(74) *Attorney, Agent, or Firm* — Schwegman Lundberg & Woessner, P.A.

(57) ABSTRACT

The disclosed subject matter compensates or corrects for errors that otherwise would be present when a measurement is made on a condensation particle counting system with the only difference causing the errors being absolute pressure. The difference in absolute pressure may be due to, for example, a change in altitude in which the condensation particle counting system is located. Techniques and mechanisms are disclosed to compensate for changes in particle count, at a given particle diameter, for changes in sampled absolute pressure at which measurements are taken. Other methods and apparatuses are disclosed.

15 Claims, 8 Drawing Sheets

(51) Int. Cl.
 *G01N 15/00* (2006.01)
 *G01N 15/14* (2006.01)

(56) References Cited

U.S. PATENT DOCUMENTS

| | | | |
|---|---|---|---|
| 2009/0009749 A1 | 1/2009 | Ahn | |
| 2009/0031786 A1* | 2/2009 | Takeuchi | G01N 15/065 73/28.04 |
| 2011/0091649 A1 | 4/2011 | Liu et al. | |
| 2017/0074792 A1* | 3/2017 | Hirano | G01N 15/065 |

FOREIGN PATENT DOCUMENTS

| | | |
|---|---|---|
| AT | 519132 | 4/2018 |
| WO | 2018053165 | 3/2018 |
| WO | 2019231889 | 12/2019 |

OTHER PUBLICATIONS

"International Application Serial No. PCT US2019 034135, Written Opinion dated Aug. 21, 2019", 6 pgs.

"International Application Serial No. PCT US2019 034135, International Preliminary Report on Patentability dated Dec. 10, 2020", 8 pages.

"European Application Serial No. 19809973.1, Response to Communication pursuant to Rules 161(2) and 162 EPC filed Mar. 12, 2021", 10 pgs.

"European Application Serial No. 19809973.1, Extended European Search Report dated Feb. 10, 2022", 10 pages.

"European Application Serial No. 19809973.1, Response filed Sep. 12, 2022 to Extended European Search Report dated Feb. 10, 2022", 16 pgs.

* cited by examiner

CONDENSATION PARTICLE COUNTER EFFICIENCY COMPENSATION FOR ALTITUDE

CLAIM OF PRIORITY

This application claims the benefit of priority to U.S. Provisional Patent Application Ser. No. 62/677,622, filed on 29 May 2018, and entitled, "CONDENSATION PARTICLE COUNTER DETECTION EFFICIENCY COMPENSATION FOR ALTITUDE," which is incorporated by reference herein in its entirety.

BACKGROUND

In a number of airborne particle measurement studies, a condensation particle counter (CPC, also known as a condensation nucleus counter, CNC) is used to detect particles in a monitored environment; the particles being too small to scatter enough light to be detected by conventional detection techniques (e.g., light scattering of a laser beam in an optical particle counter). The small particles are grown to a larger size by condensation, from a working fluid within the CPC, being formed on the particle. That is, each particle serves as a nucleation seed for the working fluid; a vapor, which is condensed onto the particles to make the particles larger. After achieving growth of the particle due to condensation of the working fluid vapor onto the particle, CPCs function similarly to optical particle counters in that the individual droplets then pass through the focal point (or line) of a laser beam, producing a flash of light in the form of scattered light. Each light flash is counted as one particle.

A thermal-cooling, diffusional, continuous laminar flow condensation particle counter (CPC) comprises, inter alia, a saturator and a condenser. In general, a particle-laden airstream sampled by the CPC is first saturated with, for example, butanol vapor as the sampled airstream passes over a heated saturator and wick combination. The now vapor-saturated airstream then flows into a cold condenser tube where the sample is cooled by thermal diffusion. The butanol condenses onto the particles and the droplets grow to micrometer sizes so that the particles can be detected easily and counted by an optical method as described above. Further, various forms of optical detection are known in the relevant art. The disclosed subject matter corrects errors that otherwise would be present when a measurement is made on the same system with the only difference being absolute pressure. The difference in absolute pressure may be due to, for example, a change in altitude.

The information described in this section is provided to offer the skilled artisan a context for the following disclosed subject matter and should not be considered as admitted prior art.

DETAILED DESCRIPTION

Figure 1:
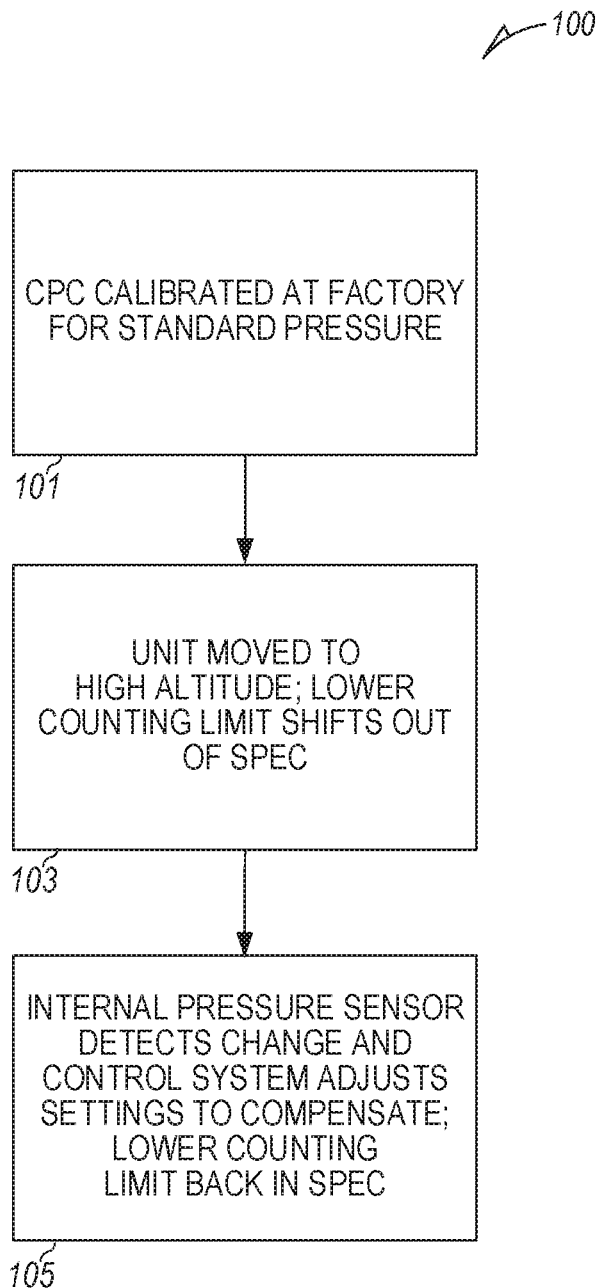
FIG. 1 shows a generalized overview of a calibration technique for high-altitude particle measurement by a condensation particle counter (CPC)

The science of condensation particle counters, and the complexity of the instrumentation, lies with the technique to condense vapor onto the particles. When the vapor surrounding the particles reaches a specific degree of supersaturation, the vapor begins to condense on the particles. The magnitude of supersaturation determines the minimum detectable particle size of the CPC. Generally, the supersaturation profile within the instrument is tightly controlled. Techniques and mechanisms are disclosed to compensate for changes in particle count, at a given particle diameter, for changes in sampled absolute-pressure (e.g., a value of absolute pressure of an aerosol stream through the CPC) at which the measurements are taken.

Since a CPC is normally factory-calibrated at a certain pressure (typically at an absolute pressure of 101.3 kPa), techniques and mechanisms disclosed here allow a CPC to be used at various values of absolute pressure with minimal measurement uncertainties. The minimal measurement uncertainties are especially important when a CPC is used for regulatory applications as these types of measurements typically have more stringent pass/fail criteria. High uncertainties in CPC count could easily fail an otherwise good measurement system.

The description that follows includes illustrative examples, devices, and apparatuses that embody the disclosed subject matter. In the following description, for purposes of explanation, numerous specific details are set forth in order to provide an understanding of various embodiments of the inventive subject matter. It will be evident, however, to those of ordinary skill in the art that various embodiments of the inventive subject matter may be practiced without these specific details. Further, well-known structures, materials, and techniques have not been shown in detail, so as not to obscure the various illustrated embodiments.

As used herein, the term "or" may be construed in an inclusive or exclusive sense. Additionally, various exemplary embodiments discussed below focus on particular ways to determine an actual particle count for a given particle size at a given absolute pressure. However, upon reading and understanding the disclosure provided herein, a person of ordinary skill in the art will readily understand that various combinations of the techniques and examples may all be applied serially or in various combinations. As an introduction to the subject, a few embodiments will be described briefly and generally in the following paragraphs, and then a more detailed description, with reference to the figures, will ensue.

In the following detailed description, reference is made to the accompanying drawings that form a part of the CPC detection-efficiency compensation for changes in pressure. For example, changes in sample-measurement pressure may be due to a change in altitude and resulting absolute-pressure differences at a given altitude in comparison to an altitude at which a detection-efficiency calibration was performed. In other examples, or combined with change in altitude, the change in sample-measurement pressure may also be due to some restrictions (e.g., needle valve, orifice, etc.) at an inlet of the CPC. The CPC detection-efficiency compensation for changes in pressure is shown, by way of illustration, as exemplary and specific embodiments. Other embodiments may be utilized and, for example, various thermodynamic, electrical, or physical changes may be made without departing from the scope of the present disclosure. The following detailed description is, therefore, is to be taken in an illustrative sense rather than in a limiting sense.

In general, a condensation particle counter (also known as a condensation nucleus counter or CNC) is used to detect particles in a monitored environment that are too small to scatter enough light to be detected by conventional detection-techniques (e.g., light scattering of a laser beam in an optical particle counter). The small particles are grown to a larger size by condensation formed on the particle. That is, each particle serves as a nucleation seed for a working fluid; a vapor, which is produced by the instrument's working fluid, is condensed onto the particles to make the particles larger. After achieving growth of the particle due to condensation of the working fluid vapor onto the particle, a CPC functions similarly to optical particle counters in that the individual droplets then pass through the focal point (or line) of a laser beam, producing a flash of light in the form of scattered light. Each light flash is counted as one particle.

While there are several methods which can be used to create condensational growth, the most widely used technique is a continuous, laminar flow method. Continuous flow, laminar CPCs have more precise temperature control than other types of CPCs, and they have fewer particle losses than instruments that use turbulent (mixing) flow. In a laminar-flow CPC, an aerosol sample is drawn continuously through a conditioner region which is saturated with vapor and the sample is brought to thermal equilibrium. The conditioner region is typically referred to as saturator. Next, the sample is pulled into a region typically referred to as condenser. Depending on the thermal conductivity of the carrier gas and mass diffusivity properties of the working fluid, a temperature of the condenser could be either lower or higher than a temperature of the saturator. For example, assuming air is the carrier gas, for an alcohol-based (e.g., isopropanol-based or butanol-based) CPC, the condenser is normally set cooler than the saturator. For a water-based CPC, the condenser is warmer than the saturators. Regardless of the type of working fluid that is used, condensation of the working fluid on the activated particles occurs in the condenser.

Condensation Particle Counters are used to measure particulate matter, especially in the sub-micrometer range of particle sizes. In one application, they are used to measure the output of combustion engine exhaust as a measure of how clean the engine is running under particular circumstances.

Currently, engine exhaust testing is often performed under standard pressure conditions (e.g., about 101.3 kPa absolute pressure). However, there is an interest in measuring particle-counting performance efficiency under reduced pressures (e.g., at high elevations) to simulate engine-emissions performance at altitudes typical of mountainous regions (e.g., such as Denver, Colo. or even much higher altitudes).

A lower-counting-size-limit of efficiency, or simply counting efficiency, is an important characteristic of a CPC. The counting efficiency can be further characterized by various particle diameter "cut-points" such as $D_{10}$, $D_{50}$, and $D_{90}$ which indicate 10%, 50%, and 90% counting efficiencies at a given particle size. A portion of the disclosed subject matter indicates that a CPC counting efficiency is affected by reduced pressure in a predictable way as noted by modeling efforts. The CPC modeling efforts are based, at least partially, on the well-known model developed by Stolzenburg (Stolzenburg, M. R., An Ultrafine Aerosol Size Distribution Measuring System; Ph. D. Thesis, University of Minnesota, Minneapolis, Minn., 1988).

Although it may be possible to do post-processing to correct CPC counting efficiency after measurements have been performed, various embodiments of the disclosed subject matter describe how to correct the counting efficiency before data are taken-using, for example, a pressure transducer at the sampling inlet of the CPC to measure the absolute pressure at the inlet. The operating parameters of the CPC, such as at least one of saturator temperature, condenser temperature, or flow, can be changed to compensate (or correct) so that the particle measurements (e.g., an engine exhaust particle measurement) are not influenced by pressure. This correction significantly reduces measurement uncertainties and is important for regulatory applications where the pass/fail criteria are typically more stringent. Governing equations to determine these values are known in the art.

Consequently, by monitoring the altitude or absolute pressure at the CPC (e.g., at the sample inlet point or some other point proximate to the CPC or monitoring environment), the error in particle count for a given particle size can be corrected within the CPC in a feedback loop. Then, the calculated factor may be determined and applied via, for example, a microprocessor, an application-specific integrated circuit (ASIC), a field-programmable gate array (FPGA) or other types of hardware, firmware, software, or other processing devices known in the art.

Additional details are provided herein for how altitude/pressure affects the lower counting efficiency limit of a typical butanol-based CPC. Also shown is how, depending on the measured particle size distribution, this efficiency shift can have a significant effect on the overall measurement uncertainties. By knowing how the CPC counting efficiency is going to shift at various absolute pressures via modeling/calculation works, based on the measured CPC inlet absolute pressure, a feedback control loop in the CPC can adjust the CPC operating parameters—specifically temperatures of the saturator and/or condenser so that the efficiency curve is shifted back to the original factory calibrated curve, thereby correcting for an error due to altitude or other pressure change.

The error can have a significant effect on, for example, whether an engine or engine system can pass a certification test or not. Therefore, when needed, it is important that the instrument compensates for testing under, for example, high-altitude conditions.

With reference now to FIG. 1, a generalized overview of a calibration technique 100 for high-altitude particle measurement by a condensation particle counter (CPC) is shown. For example, a CPC may be calibrated, at operation 101, for standard pressure (e.g., 101.3 kPa) by a manufacturer of the CPC at the factory, which is at, for example, 289 meters (approximately 948 feet) above sea level. The CPC is then moved, at operation 103, to a high altitude (e.g., relative to the point of the factory calibration) at, for example, 3000 meters (approximately 9843 feet). At 3000 meters, there is a lower absolute pressure than standard pressure. A pressure sensor (e.g., any of various types of pressure transducers known in the art) installed in or proximate to the CPC detects, at operation 105, a pressure change and an internal control system adjusts settings of the CPC to compensate for the particle measurement or count to compensate for the reduced pressure at a higher elevation. Consequently, the compensation places a counting efficiency of the CPC to within specification.

In alternative embodiments, the CPC can also be adjusted for pressures that are higher than standard pressure. As used herein, pressures either higher or lower than the absolute pressure used by the manufacturer to calibrate the CPC are referred to as non-standard pressures.

Upon reading and understanding the disclosed subject matter, the person of ordinary skill in the art will further understand that the CPC does not physically need to be moved between various altitudes to test and verify the detection efficiency. Such pressure changes may be affected by, for example, a confined box in which the CPC is placed, and the confined box may be adjusted to higher or lower pressures. Further, as noted above, the CPC may also experience an absolute pressure change when the inlet flow is restricted by a device (such as needle valve, orifice, etc.).

Figure 2A:
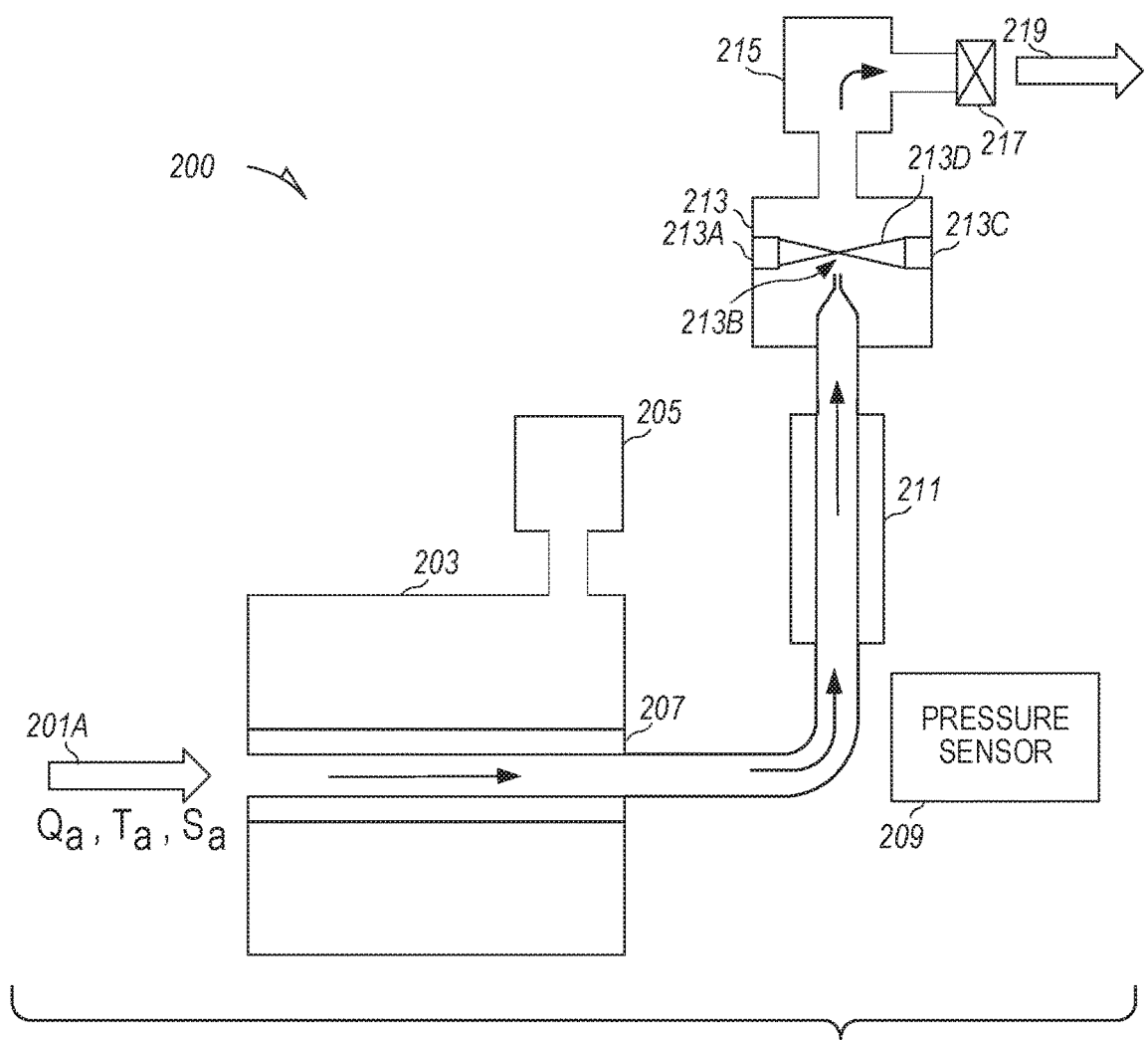
FIG. 2A shows a simplified, diagrammatic representation of a cross-sectional view of a CPC, in accordance with various embodiments.

FIG. 2A shows a simplified, diagrammatic representation of a cross-sectional view 200 of a CPC, in accordance with various embodiments. FIG. 2A is shown to include an aerosol-sample inlet 201A, through which an aerosol stream flows into the CPC. The aerosol stream is drawn into and through the CPC by a sample-flow pump 215. The sample-flow pump 215 may either be a pump internal to the CPC or may be an externally-connected pump. FIG. 2A also shows a saturator block 203, a porous-material block 207, and a working-fluid reservoir 205, which contains the working fluid (e.g., butanol).

The saturator block 203 and the porous-material block 207, both heated, produce a vapor, (e.g., a supersaturated vapor) of the working fluid. The aerosol stream flows through the vapor of working fluid.

After the aerosol stream flows from the saturator block 203 and porous-material block 207, the aerosol stream continues to a condenser block 211. For a butanol-based CPC, the condenser block 211 is generally at a lower temperature than the saturator block 203 and porous-material block 207. Therefore, in this situation, the vapor of the working fluid in the cooler environment of the condenser block 211 condenses onto particles (e.g., nucleation seeds for the vapor as described above) within the aerosol stream, forming droplets (particles with an outer coating of vapor condensate). As the vapor condenses onto the particles, the droplets grow to micrometer sizes that are more readily detected by an optical particle-detector block 213.

The droplets continue to the optical particle-detector block 213. The droplets are directed through a focus point 213B of light (e.g., a diffraction-limited spot or a line of light that is generally perpendicular to both the direction of the light beam and the aerosol flow path) of a beam of light emitted by a light source 213A. The light source 213A is typically a solid-state laser diode. The focus point 213B is formed by an optical element that is focusing light output from the light source 213A. Scattered radiation 213D, individually created by each of the droplets, is sensed by an optical detector 213C. The aerosol stream carrying the droplets continues out of the optical particle-detector block 213 and through the sample-flow pump 215. Droplets as well as remaining particles in the aerosol stream are filtered by an absolute filter 217 prior to release to, for example, ambient air in an outlet stream 219 so as not to increase a contamination level of the monitored environment.

A pressure sensor 209 proximate to the condenser block 211 provides a measured value of absolute pressure. As used herein, "proximate" can mean in or near the CPC or in an environment where the same absolute pressure is measured as the environment within which the CPC is operating. In a specific exemplary embodiment, the pressure sensor 209 is contained within the CPC to account for a pressure increase due to restrictions (e.g., needle valve, orifice, etc.) at or near the aerosol-sample inlet 201A of the CPC With reference now to FIG. 2B, and continuing reference to FIG. 2A, a simplified, schematic diagram 230 of a cross-section of a CPC condenser (e.g., the condenser block 211 of FIG. 2A) and related operational parameters for determining a high-altitude calibration of a CPC is shown. As noted above, a thermal-cooling, diffusional, continuous laminar-flow CPC comprises, at least partially, the saturator block 203 and the condenser block 211. As noted above, in a butanol-based CPC, the aerosol stream is first saturated with butanol vapor as the sample passes over a heated version of the saturator block 203 and the porous-material block 207. The vapor-saturated airstream then flows into a condenser inlet 201B of a cold tube comprising the condenser block 211, where the sample is cooled by thermal diffusion. The butanol condenses onto the particles and the resulting droplets grow to micrometer-range sizes so that they can be detected easily and counted by an optical counting method as described above.

Figure 2B:
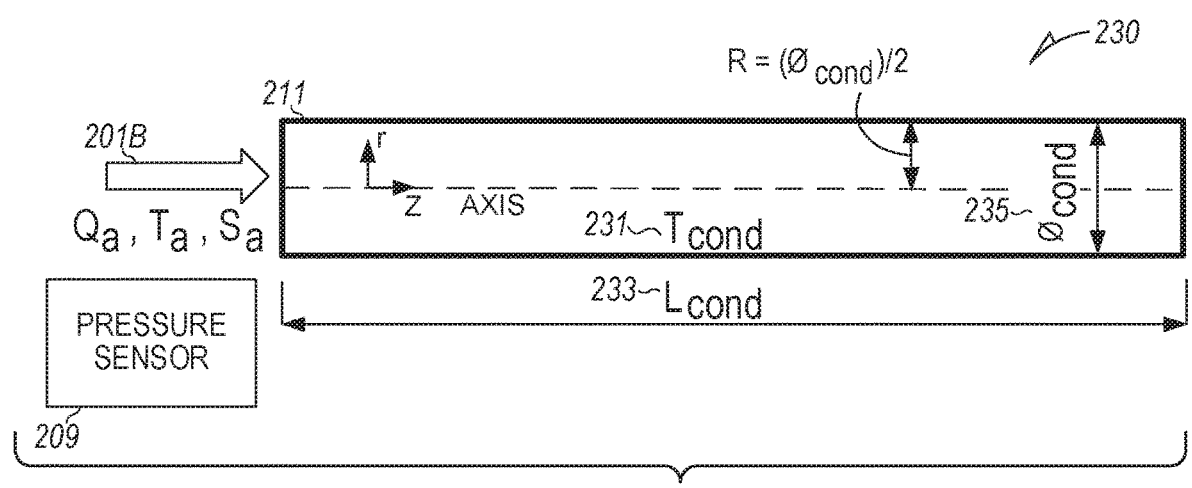
FIG. 2B shows a simplified, schematic diagram of a cross-section of a CPC condenser and related operational parameters for determining a high-altitude calibration of a CPC.

In the embodiments provided herein, a thermal diffusional CPC with a 1 liter-per-minute (1 µm) of sample (e.g., aerosol) flow rate is modeled. Since particles are activated and grown in the condenser block 211, only the condenser block 211 is modeled. For pipe flow, the model can be further simplified by using an axisymmetric assumption as shown in FIG. 2B by $R=(\phi_{cond})/2$.

The CPC parameters include a temperature, $T_{cond}$, 231, a length, $L_{cond}$, 233, and an inner diameter, $\phi_{cond}$, 235, of the condenser block 211. Operational parameters include:

$Q_a$=aerosol volumetric flow rate;

$T_a$=aerosol temperature, which is typically the same as the saturator temperature; and $S_a$=aerosol saturation ratio, which is typically equal to 1.0.

The carrier gas used in this embodiment is air, but other carrier gases can be modeled if thermal and mass properties of the carrier gas are known. For this example, CPCs with two $D_{50}$ cut-points, at 10 nm and 23 nm, were modeled.

As a person of ordinary skill in the art will recognize, upon reading and understanding the disclosure provided herein, a number of other parameters may be considered as well; the exemplary model assumes fully-developed laminar flow and constant thermal and mass diffusivities in the condenser. Aerosol flow at the entrance is assumed to be plug flow but other flow parameters may be considered as well. Each of these other parameters are known to a skilled artisan in the fluid mechanics and thermodynamics arts.

In this embodiment, and as described in more detail below, the model first computes temperature and vapor pressure profiles. Saturation ratio and particle-activation efficiencies are then computed based on these profiles.

Theoretical activation efficiencies at standard pressure (101.3 kPa) are compared to empirical counting-efficiencies of a particular CPC. A discrepancy may occur due to the particle losses to the walls, non-uniform temperature and flow profiles, and insufficient residence time in the actual CPC. Some uncertainties of the modeling parameters such as mass, thermal mass diffusivities, and a boundary layer effect may also contribute to the discrepancy.

To account for a difference between the theoretical and empirical data, an effective change in temperature, $\Delta T$, of $(T_a - T_{cond})$ is used to calibrate and fine tune the model (and, consequently, a resulting change to the condenser temperature, $T_{cond}$). For the CPC modeling work described herein, the difference between the effective and actual differential temperatures ($\Delta Ts$) are small and less than 4° C. for both the 23 nm and the 10 nm cases. Once the effective $\Delta T$ is determined, it is used in, for example, both the standard pressure (101.3 kPa) and low pressure (72 kPa) CPC modeling. These stated pressures are given as examples only; the disclosed subject matter is not limited to these pressures.

Figure 3:
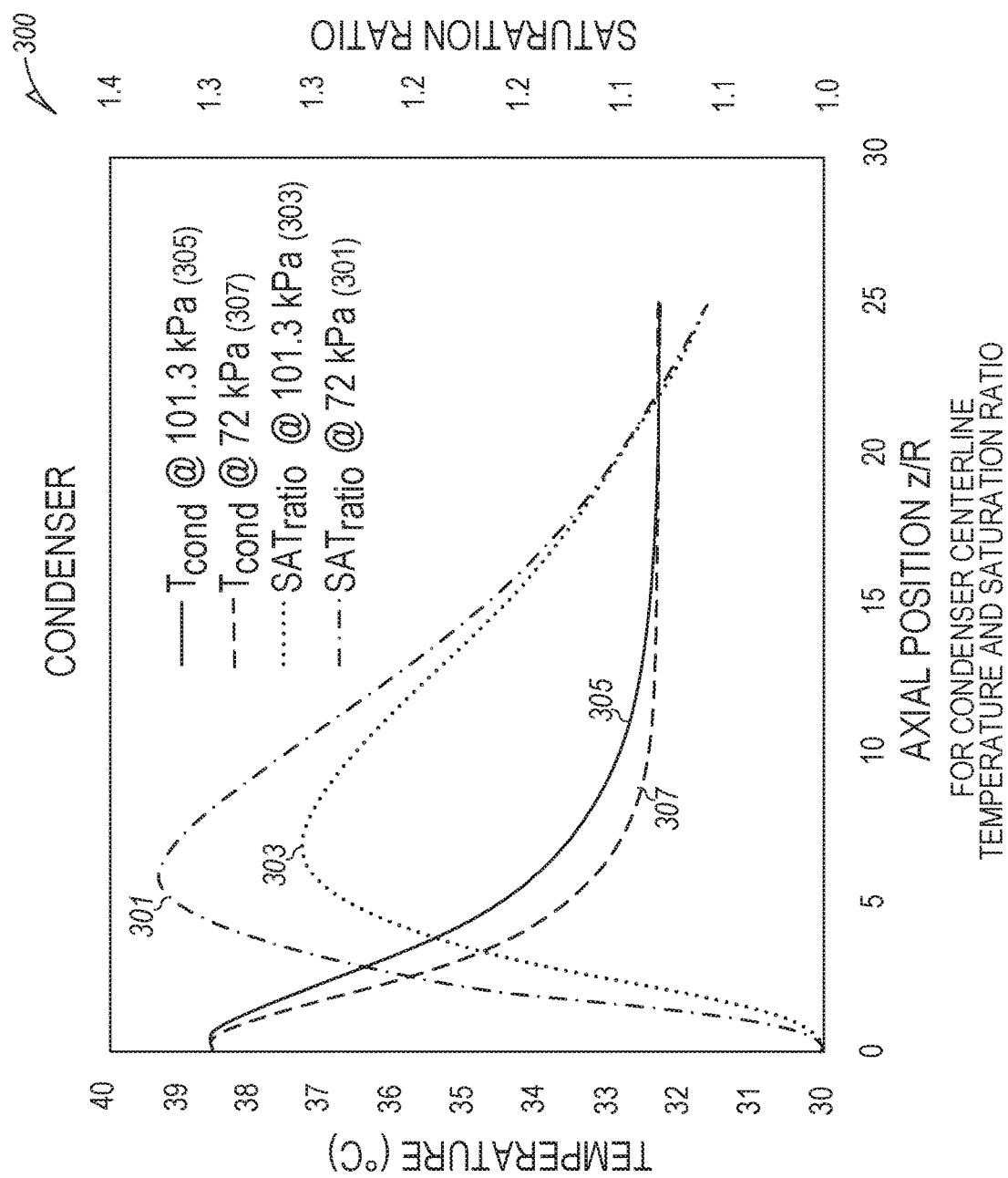
FIG. 3 shows a graph of a condenser centerline-temperature and saturation ratio of a CPC condenser.

FIG. 3 shows a graph 300 of a condenser centerline-temperature and saturation ratio of a CPC condenser. The condenser centerline temperature and saturation ratio for the 23 nm CPC are shown in FIG. 3 with the left-side ordinate axis relating to the condenser temperatures, $T_{cond}$, and the right-side ordinate axis relating to the saturation rations, $SAT_{ratio}$. For example, a first saturation ratio curve 301 shows a saturation ratio, $SAT_{ratio}$, at pressure of 72 kPa and a related first temperature curve 307 shows a temperature, $T_{cond}$, of the condenser at 72 kPa. A second curve 303 shows a saturation ratio, $SAT_{ratio}$, at a pressure of 101.3 kPa and a related second temperature curve 305 shows a temperature, $T_{cond}$, of the condenser at 101.3 kPa.

Figure 4A:
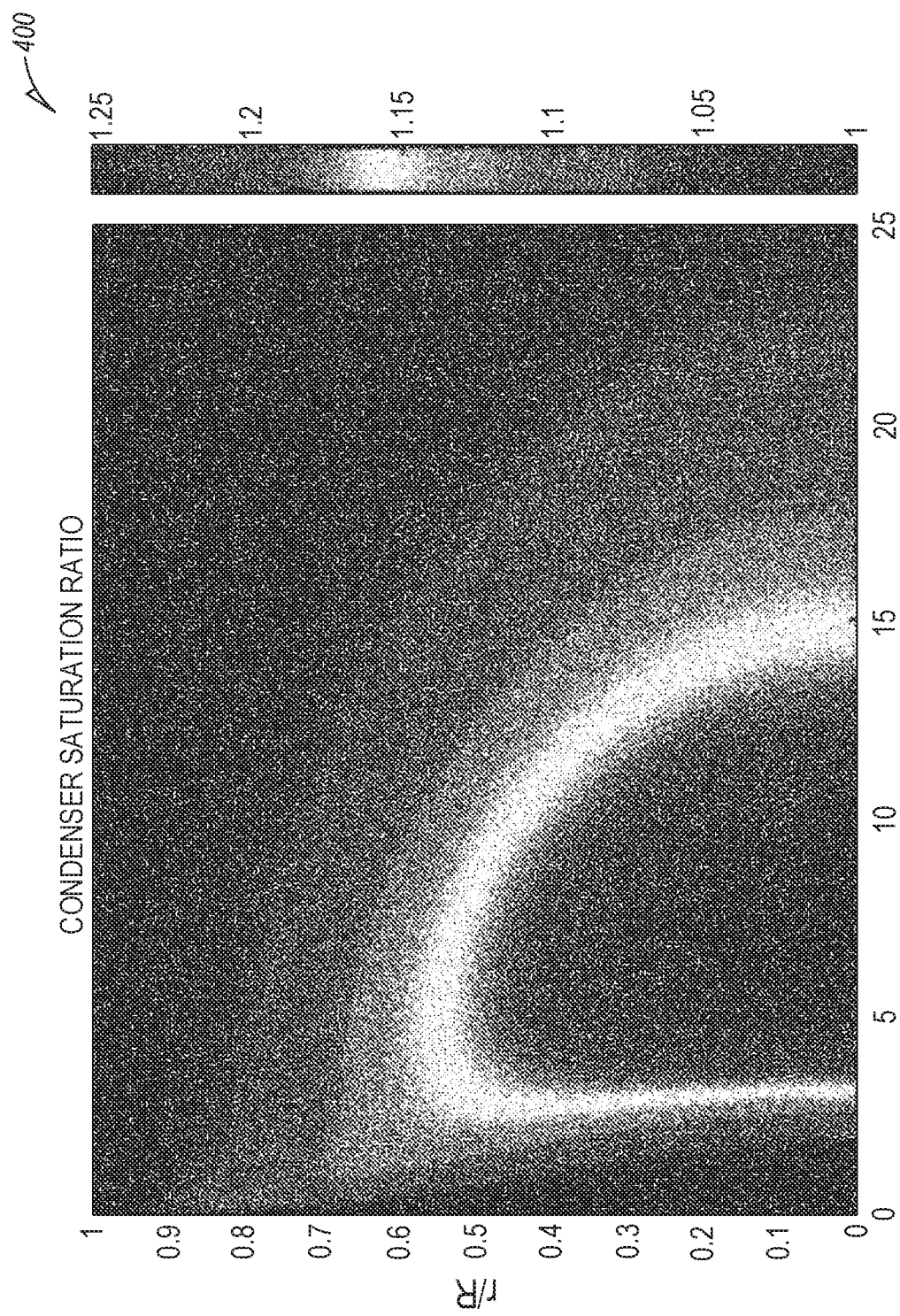
FIG. 4A shows a condenser saturation-ratio profile at an absolute pressure of 101.3 kPa (standard pressure)
Figure 4B:
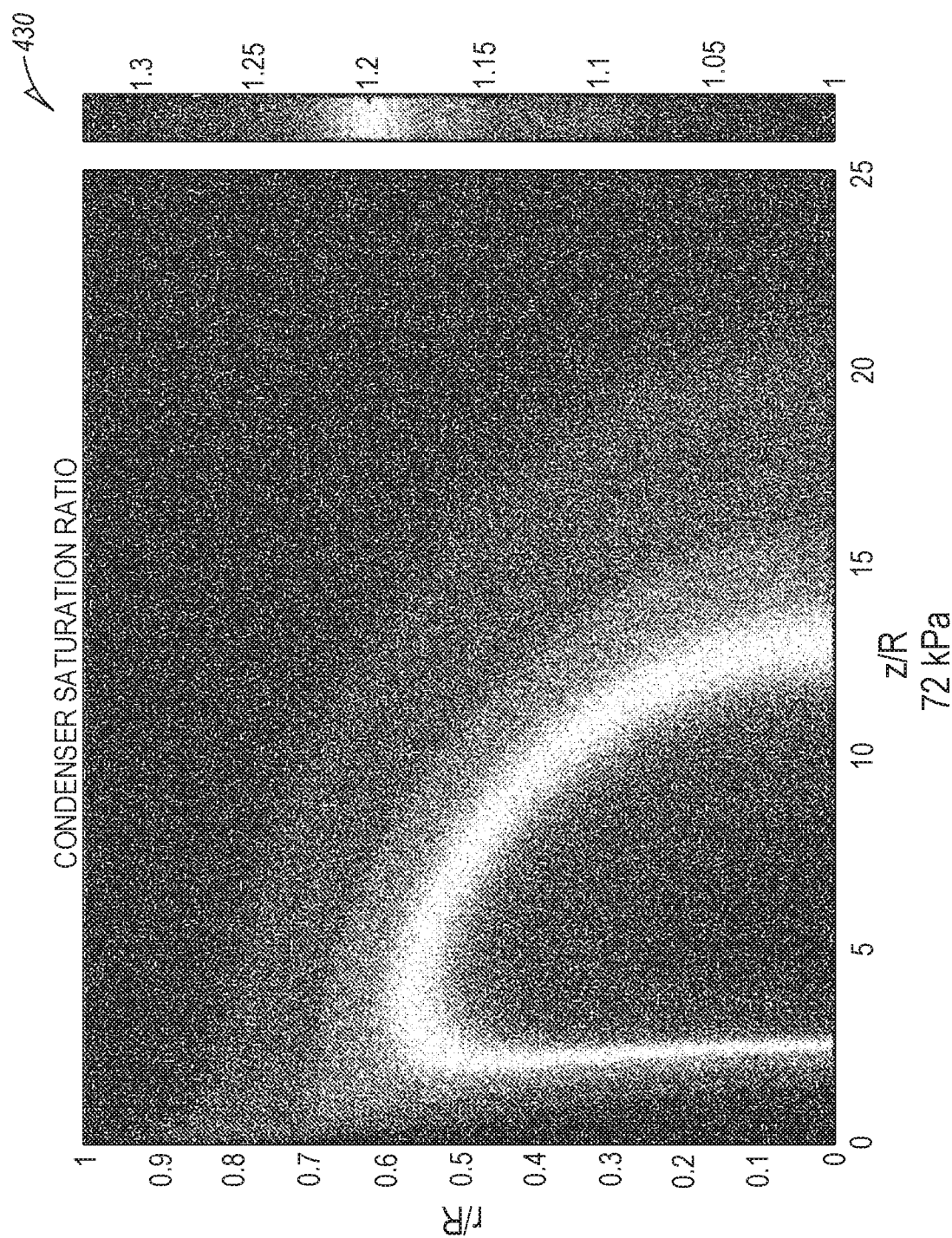
FIG. 4B shows a condenser saturation-ratio profile at an absolute pressure of 72 kPa as would be expected at an altitude of about 3000 m.

FIG. 4A shows a condenser saturation-ratio profile at an absolute pressure of 101.3 kPa (e.g., standard atmospheric pressure). FIG. 4B shows a condenser saturation-ratio profile at an absolute pressure of 72 kPa, as a pressure that would be expected at an altitude of about 3000 meters. Both condenser saturation-ratio profiles are for a 23 nm CPC. Note that the axial and radial positions of the saturation-ratio profiles shown in FIGS. 4A and 4B are normalized by the physical parameters of the condenser (length and radius). The profiles for the 10 nm CPC are not shown as they have similar trends.

The modeling results indicate that condenser centerline temperatures decrease more rapidly at lower pressure due to higher kinematic viscosity and thermal diffusivity of a working fluid at a lower pressure. Since saturation vapor pressure is a function of temperature, lower condenser temperature generates lower saturation vapor-pressure. The saturation ratio, $SAT_{ratio}$, is defined as a ratio of vapor pressure, $P_v$, and saturation vapor-pressure, $P_{sat}$, for example, as shown below:

$$SAT_{ratio} = \frac{P_v}{P_{sat}}$$

Since working-fluid vapor-pressure is mainly a function of saturator temperature, vapor pressures in the condenser, $P_v$, are about the same at 101.3 kPa and 72 kPa ambient pressure. Therefore, the saturation ratio increases with lower saturation vapor-pressure, $P_{sat}$, resulting in smaller CPC activation cut-points as activation efficiencies are determined with Kelvin diameters. The Kelvin diameter is the diameter at which a pure liquid droplet is in equilibrium with the vapor phase at a given supersaturation level. The Kelvin diameter is a function of saturation ratio.

Figure 5A:
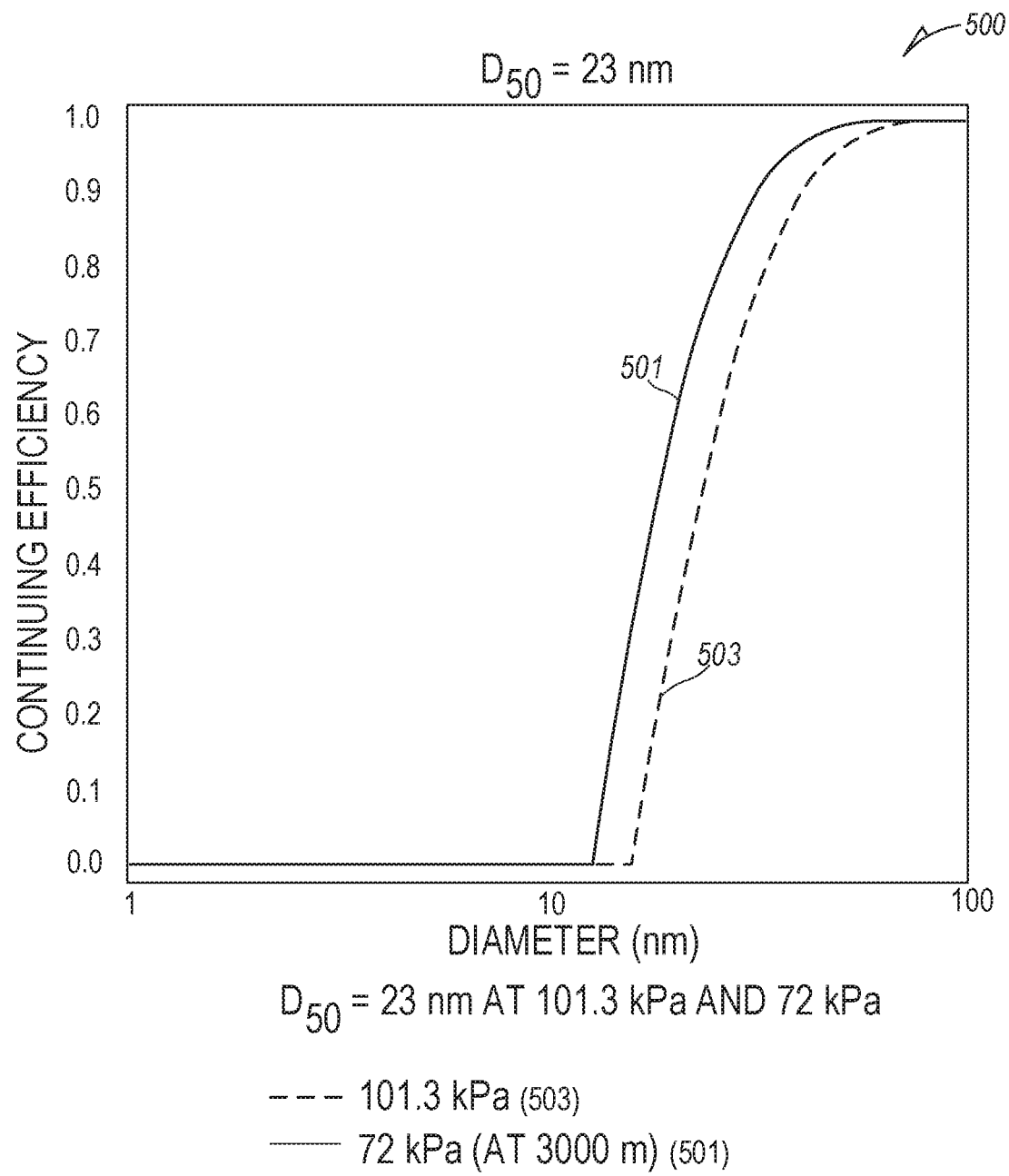
FIG. 5A shows a graph of activation efficiencies at standard absolute-pressure (101.3 kPa) and low absolute-pressure (72 kPa) for a $D_{50}$ particle diameter of 23 nm (a $D_{50}$ particle diameter corresponding to a 50% sampling efficiency)

FIG. 5A shows a graph 500 of activation efficiencies at standard absolute-pressure (101.3 kPa) and low absolute-pressure (72 kPa) for a $D_{50}$ particle diameter of 23 nm. A first curve 501 shows counting efficiency as a function of particle diameter at 72 kPa. A second curve 503 shows counting efficiency as a function of particle diameter at 101.3 kPa.

Figure 5B:
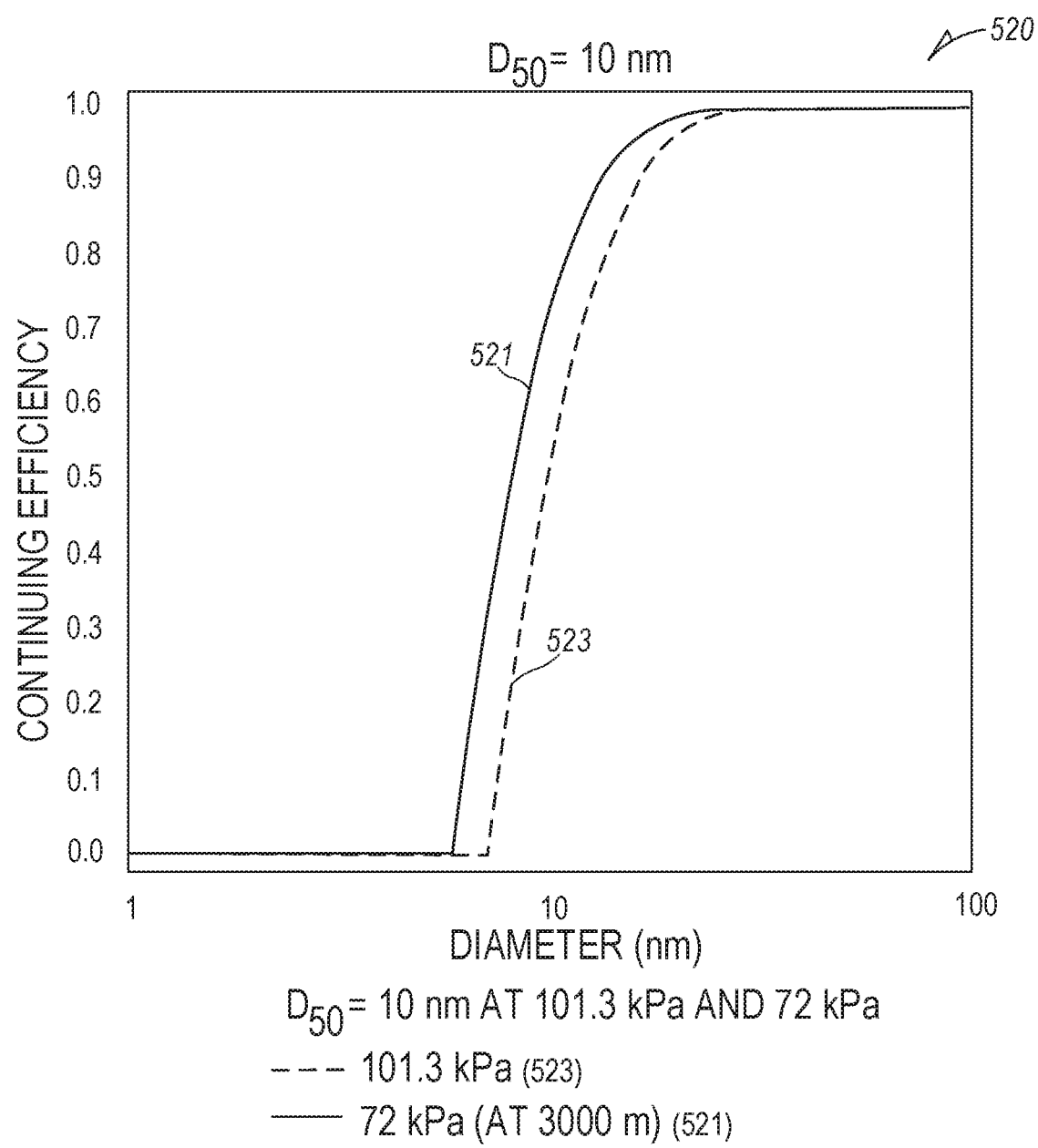
FIG. 5B shows a graph of activation efficiencies at standard absolute-pressure (101.3 kPa) and low absolute-pressure (72 kPa) for a $D_{50}$ particle diameter of 10 nm.

FIG. 5B shows a graph 520 of activation efficiencies at standard absolute-pressure (101.3 kPa) and low absolute-pressure (72 kPa) for a $D_{50}$ particle diameter of 10 nm. A first curve 521 shows counting efficiency as a function of particle diameter at 72 kPa. A second curve 523 shows counting efficiency as a function of particle diameter at 101.3 kPa.

As noted by the graphs 500, 520 of FIGS. 5A and 5B, the activation efficiencies shift to lower (smaller) sizes at lower ambient pressures. For example, and with continuing reference to FIG. 5A, the $D_{50}$ particle diameter shifts from about 23 nm to about 18.3 nm when the ambient absolute-pressure changes from 101.3 kPa to 72 kPa. With reference to FIG. 5B, the $D_{50}$ particle diameter shifts from 10 nm to about 8.1 nm when the ambient absolute-pressure changes from 101.3 kPa to 72 kPa. To mitigate the counting-efficiency curve-shifting issues, the $D_{50}$ particle diameters can be moved back to original values by adjusting at least one of the saturator temperature and the condenser temperature by various techniques as described herein.

Figure 6:
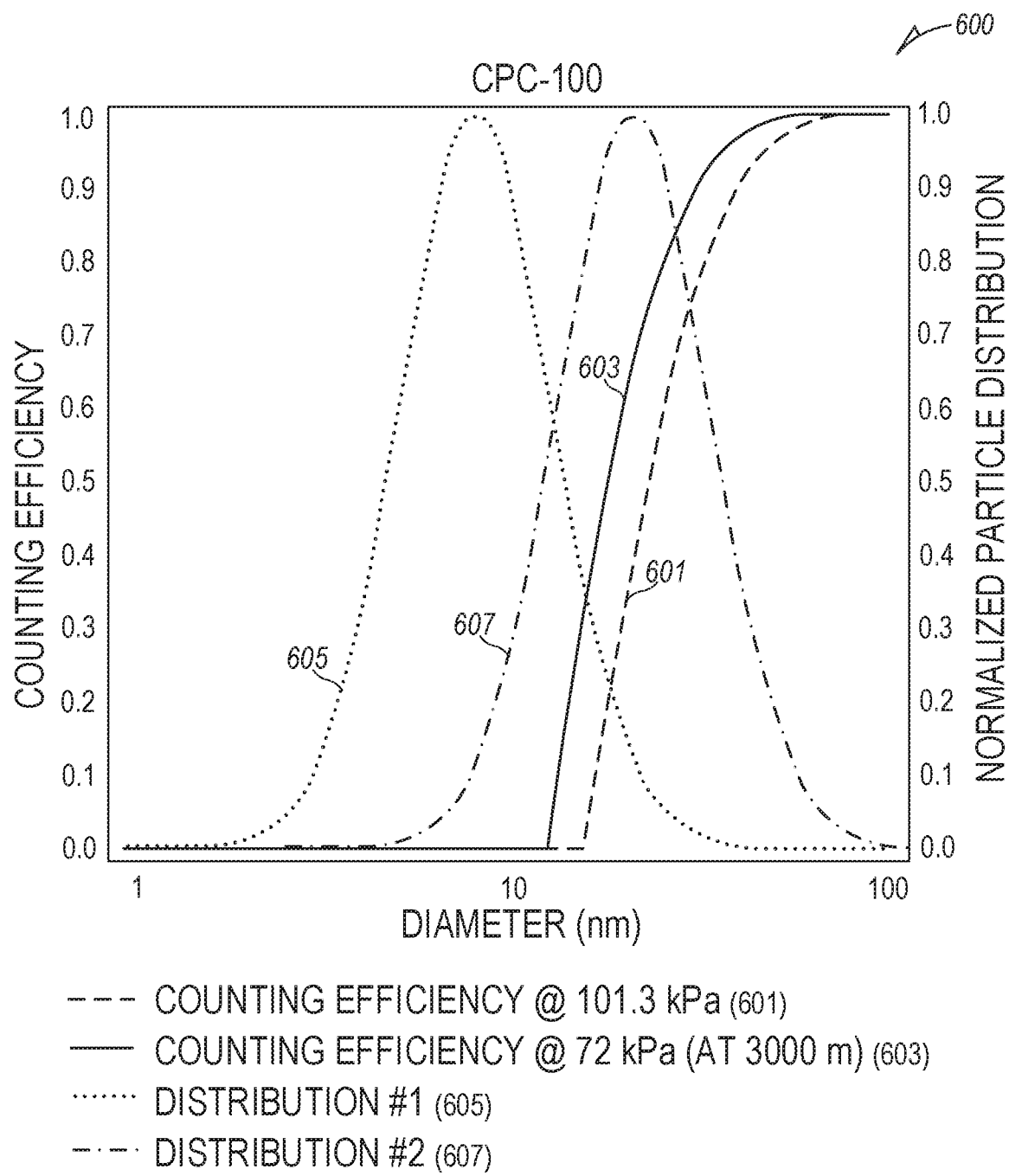
FIG. 6 shows a graph of counting efficiency curves for $D_{50}$ at 23 nm and normalized size distributions.

To demonstrate the effect of the counting-efficiency shifting on particle counting, FIG. 6 shows a graph 600 of counting efficiency curves at 101.3 and 72 kPa and normalized size distributions, both as a function of particle diameter. A counting-efficiency curve 601 represents a correct, factory-calibrated calibration point $D_{50}$ at 23 nm while a counting-efficiency curve 603 represents an inaccurate, shifted curve due to the pressure change. The left-side ordinate axis indicates counting efficiency and the right-side ordinate axis indicates a normalized particle-size distribution. Two pseudo-normalized lognormal particle-size distributions are generated to investigate the effect of the counting efficiency shift on total particle count. The count median diameters of these two pseudo distributions are at about 8 nm (as indicated by a left-side distribution curve 605), and at about 21 nm (as indicated by a right-side distribution curve 607), and the geometric standard deviations are both 1.6.

Table I, below, shows estimated CPC counts correlating with the efficiency curves of FIG. 6. To estimate a CPC count, the distributions are convoluted with the CPC counting efficiencies, with results being shown in Table I. For example, for Distribution #1 (the left-side distribution curve 605), the shift in the counting efficiency curve would have a small effect as the count difference is only about 3% because most of the particles in the left-side distribution curve 605 are less than 15 nm and this portion of the distribution does not overlap with either counting-efficiency curve 601, 603 so it is not affected by them. The shift in counting efficiency would have a larger impact for Distribution #2 (the right-side distribution curve 607) as the count difference is about 16%. This large counting error is not acceptable for a high precision instrument such as a CPC and the error can easily fail, for example, regulatory applications that have more stringent pass/fail criteria. For distributions with particles much larger than 23 nm, the impact will be minimum as most of the particles would be counted by both counting efficiency curves (results not shown). Therefore, the researchers of the disclosed subject matter concluded that distributions with peaks around the $D_{50}$ particle diameter would see more change in the CPC count whereas distributions with peaks much smaller or larger than the $D_{50}$ particle diameter would experience a lesser effect.

TABLE I

|  | Pressure 101.3 kPa | Pressure 72 kPa | Difference |
|---|---|---|---|
| Distribution #1 | 2% | 5% | 3% |
| Distribution #2 | 40% | 56% | 16% |

Although specific values, ranges of values, and techniques are given various parameters discussed above, these values and techniques are provided merely to aid the person of ordinary skill in the art in understanding certain characteristics of the designs disclosed herein. Those of ordinary skill in the art will realize, upon reading and understanding the disclosure provided herein, that these values and techniques are presented as examples only and numerous other values, ranges of values, and techniques may be employed while still benefiting from the novel designs discussed herein that may be employed to the CPC detection efficiency compensation for altitude disclosed herein. Therefore, the various illustrations of the apparatus are intended to provide a general understanding of the structure and design of various embodiments and are not intended to provide a complete description of all the elements and features of the apparatus that might make use of the structures, features, and designs described herein.

Many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to a person of ordinary skill in the art from the foregoing descriptions. Portions and features of some embodiments may be included in, or substituted for, those of others. Many other embodiments will be apparent to those of ordinary skill in the art upon reading and understanding the description provided herein. Such modifications and variations are intended to fall within a scope of the appended claims. The present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A system to correct for a detection efficiency of a condensation particle counter (CPC) at a non-standard absolute-pressure, the system comprising:
   a pressure transducer mounted proximate the CPC to determine a value of absolute pressure of an aerosol stream through the CPC;
   a sensor to monitor a value of at least one of saturator temperature of a saturator block of the CPC, a condenser temperature of a condenser block of the CPC, and a flow rate of the aerosol stream through the CPC; and
   a processing device to compensate for detection efficiency of the CPC based on the determined absolute pressure of the aerosol stream through the CPC and at least one of the monitored values of saturator temperature, condenser temperature, and flow rate, the processing device further to compensate for particle measurements reported by the CPC for the non-standard absolute pressure, the processing device is further to compute a temperature difference between the saturator block and the condenser block to shift the detection efficiency of the CPC operating at the non-standard absolute-pressure back to an original calibration curve using the determined value of absolute pressure of the aerosol stream through the CPC.

2. The system of claim 1, wherein a particle size measured by the CPC relates to a $D_{50}$ particle diameter.

3. The system of claim 2, wherein the processing device is further configured to shift the $D_{50}$ particle diameter to an original calibrated value by adjusting at least one of the saturator temperature and the condenser temperature.

4. The system of claim 1, wherein the non-standard absolute-pressure is a pressure that is either higher or lower than a pressure at which the CPC was calibrated.

5. The system of claim 1, wherein at least one of saturator temperature, the condenser temperature, and the flow rate is changed to compensate for the particle measurements at the non-standard absolute-pressure.

6. The system of claim 1, wherein the processing device is configured to use the determined value of absolute pressure of the aerosol stream through the CPC to provide a feedback control loop in the CPC to adjust at least one of the saturator temperature and the condenser temperature to compensate for the particle measurements to correct for the non-standard absolute-pressure.

7. The system of claim 1, wherein the processing device is further configured to correct the detection efficiency of the CPC in substantially real time using the determined temperature difference between the saturator block and the condenser block.

8. A method of compensating for a detection efficiency of a condensation particle counter (CPC) at a non-standard absolute pressure, the method comprising:
   determining a value of absolute pressure of an aerosol stream through the CPC;
   monitoring a value of at least one of saturator temperature of a saturator block of the CPC, a condenser temperature of a condenser block of the CPC, and a flow rate of the aerosol stream through the CPC;
   computing a temperature difference between the saturator block and the condenser block to shift the detection efficiency of the CPC operating at the non-standard absolute-pressure back to an original calibration curve using the determined value of absolute pressure of the aerosol stream through the CPC;
   compensating for detection efficiency of the CPC based on the determined absolute pressure value and at least one of the monitored values of saturator temperature, condenser temperature, and flow rate; and
   compensating for particle measurements reported by the CPC for the non-standard absolute pressure based on the determined value of absolute pressure and the at least one of saturator temperature, condenser temperature, and flow rate values.

9. The method of claim 8, wherein a particle size measured by the CPC relates to a $D_{50}$ particle diameter.

10. The method of claim 9, further comprising shifting the $D_{50}$ particle diameter to an original calibrated value by adjusting at least one of the saturator temperature and the condenser temperature.

11. The method of claim 8, wherein the non-standard absolute-pressure is a pressure that is either higher or lower than a pressure at which the CPC was calibrated.

12. The method of claim 8, further comprising changing at least one of saturator temperature, condenser temperature, and flow rate to compensate for the particle measurements at the non-standard absolute-pressure.

13. The method of claim 8, further comprising using the determined value of absolute pressure of the aerosol stream through the CPC to provide a feedback control loop in the CPC to adjust at least one of the saturator temperature and the condenser temperature to compensate for the particle measurements to compensate for the non-standard absolute-pressure.

14. The method of claim 8, further comprising correcting the detection efficiency of the CPC in substantially real time using the determined temperature difference between the saturator block and the condenser block.

15. A method of compensating for a detection efficiency of a condensation particle counter (CPC) at a non-standard absolute pressure, the method comprising:

calibrating the CPC at a given pressure;

sensing, proximate to the CPC, a value of absolute pressure of an aerosol stream through the CPC;

computing a temperature difference between a saturator block and a condenser block of the CPC to shift the detection efficiency of the CPC operating at the non-standard absolute-pressure back to an original calibration curve using the sensed value of absolute pressure of the aerosol stream through the CPC; and adjusting at least one of a saturator temperature of the saturator block and a condenser temperature of the condenser block to compensate for a shift in the detection efficiency of the CPC, the shift being caused by a pressure at which the CPC is operating when the pressure is different from a pressure at which the CPC was calibrated.

* * * * *

UNITED STATES PATENT AND TRADEMARK OFFICE
CERTIFICATE OF CORRECTION

| | | |
|---|---|---|
| PATENT NO. | : 11,519,841 B2 | Page 1 of 1 |
| APPLICATION NO. | : 16/423791 | |
| DATED | : December 6, 2022 | |
| INVENTOR(S) | : Caldow et al. | |

It is certified that error appears in the above-identified patent and that said Letters Patent is hereby corrected as shown below:

In the Specification

In Column 6, Line 37, delete "(1 μm)" and insert --(lpm)-- therefor

Signed and Sealed this
Seventeenth Day of December, 2024

Derrick Brent
*Acting Director of the United States Patent and Trademark Office*